United States Patent
Piersol

(10) Patent No.: US 6,775,665 B1
(45) Date of Patent: Aug. 10, 2004

(54) SYSTEM FOR TREATING SAVED QUERIES AS SEARCHABLE DOCUMENTS IN A DOCUMENT MANAGEMENT SYSTEM

(75) Inventor: Kurt W. Piersol, Santa Cruz, CA (US)

(73) Assignee: Ricoh Co., Ltd., Tokyo (JP)

(*) Notice: Subject to any disclaimer, the term of this patent is extended or adjusted under 35 U.S.C. 154(b) by 0 days.

(21) Appl. No.: 09/439,151

(22) Filed: Nov. 12, 1999

Related U.S. Application Data

(63) Continuation-in-part of application No. 09/410,364, filed on Sep. 30, 1999.

(51) Int. Cl.[7] .............................................. G06F 17/30
(52) U.S. Cl. ............................................... 707/4; 707/5
(58) Field of Search ................................ 707/3, 1–5, 9; 705/500

(56) References Cited

U.S. PATENT DOCUMENTS

| | | | |
|---|---|---|---|
| 5,157,783 A | | 10/1992 | Anderson et al. |
| 5,634,051 A | * | 5/1997 | Thomson ........................ 707/5 |
| 5,678,041 A | * | 10/1997 | Baker et al. .................... 707/1 |
| 5,802,512 A | | 9/1998 | Wallack |
| 5,875,441 A | * | 2/1999 | Nakatsuyama ................. 707/1 |
| 5,893,908 A | * | 4/1999 | Cullen et al. ................. 345/839 |
| 5,926,808 A | * | 7/1999 | Evans et al. .................... 707/1 |
| 5,999,925 A | * | 12/1999 | Evans ............................ 707/5 |
| 6,009,271 A | * | 12/1999 | Whatley ..................... 707/203 |
| 6,028,601 A | * | 2/2000 | Machiraju et al. .......... 345/705 |
| 6,070,157 A | * | 5/2000 | Jacobson et al. ............... 707/1 |
| 6,131,092 A | * | 10/2000 | Masand ......................... 707/3 |
| 6,151,603 A | * | 11/2000 | Wolfe .......................... 707/10 |
| 6,237,011 B1 | * | 5/2001 | Ferguson et al. ........... 707/500 |
| 6,240,408 B1 | * | 5/2001 | Kaufman ....................... 707/3 |
| 6,282,538 B1 | * | 8/2001 | Woods .......................... 704/9 |
| 6,285,998 B1 | * | 9/2001 | Black et al. ................. 345/810 |
| 6,360,215 B1 | * | 3/2002 | Judd et al. ..................... 707/3 |
| 2003/0061215 A1 | * | 3/2003 | Messina |

FOREIGN PATENT DOCUMENTS

EP          0 886 228 A2    12/1998

* cited by examiner

Primary Examiner—Greta Robinson
Assistant Examiner—Debbie M. Le
(74) Attorney, Agent, or Firm—Blakely, Sokoloff, Taylor & Zafman LLP

(57) ABSTRACT

A file management appliance ("FMA") is a device that utilizes multiple processes and queues to provide document capture and indexing services as part of a document management system. Through the document capture and indexing services of an FMA-based system, documents are archived into one or more data storage devices, thereby forming a document database. One mechanism by which users may search for and access such archived data from one or more document databases is by formulating and submitting one or more queries to the FMA system. Queries formulated within an FMA system are treated as documents within the FMA system and accordingly may be archived within the document database for later retrieval and execution.

27 Claims, 14 Drawing Sheets

|  | Attribute Name | Meaning |
|---|---|---|
| 410 | FMA ID | Identifier for the FMA which identifier is unique in the world |
| 420 | Serial number | Unique identifier for the document on the NOA |
|  | Document name | The name of the document somehow defined |
| 430 | Document owner | The user/group who currently owns the copy |
| 440 | Document capturer | The user/group who captured the document |
| 445 | Capturer device type | The type of device from which the document was captured |
|  | Capturer device name | The name of device from which the document was captured |
|  | Transport direction | Whether or not the document was incoming, outgoing, with no direction, or with both directions when it was captured. |
| 450 | Capture date | The date when the document was archived |
|  | Creation date | The date when the document was captured by a capturing NOA or the last date it was modified on a PC |
|  | Last read on | The last date when the copy was read |
|  | Location | The location on main disk/backup |
| 490 | Backed Up | The identifier tells whether the document has been backed up and the backup medium where it is |
|  | Public | Whether or not the document is public |
| 480 | Indexed | Whether or not the document is indexed |
|  | Total pages | The number of total pages of the document if known |
| 470 | Compressed | Whether or not the document has been processed by the compression daemon |
| 460 | OCRed | Whether or not the document has been OCR'ed |
|  | Return receipt to | The URL to which the receipt is to be returned after indexing |
|  | Fax number | The fax number of the other party in case that the document is a fax document |
|  | Mail from | The ?from? Header address in case that the document is an e-mail |
|  | Mail to | The ?to? Header address(es) in case that the document is an e-mail |
|  | File to index | The name of the file to be indexed |
|  | Thumbnail | The name of the thumbnail file |
|  | Copy of | The serial number of the original document if it is copied after indexed, the serial number of the document itself otherwise |

FIG. 4

|     | Attribute Name | Meaning |
| --- | --- | --- |
| 510 | FMA ID | Decimal numerical string that represents a positive integer |
| 520 | Serial number | Decimal numerical string that represents a positive integer |
|     | Document name | Any character data |
| 530 | Document owner | String that represents the name of registered user/group; or a comma-separated list of users and/or groups |
| 540 | Document capturer | String that represents the name of registered user/group |
| 545 | Capturer device type | String that represents the type of capturing NOA; Choice of "Copier" "Fax" "Printer" "email" and "PC" |
|     | Capturer device name | String that represents the network name of capturing NOA |
|     | Transport direction | One of "in" "out" "no" and "both" |
| 550 | Capture date | String that represents a UNIX date typically in the format of "YYYYMMDDhhmmss" where the time zone is GMT |
|     | Creation date | String that represents a UNIX date typically in the format of "YYYYMMDDhhmmss" where the time zone is GMT |
|     | Last read on | String that represents a UNIX date typically in the format of "YYYYMMDDhhmmss" where the time zone is GMT |
|     | Location | String that represents a pathname of the directory |
| 590 | Backed Up | Decimal numerical string that represents a nonnegative integer; 0 means the document has not been backed up other number means the identifier of the backup medium |
|     | Public | Boolean string, that is one of "true" and "false" |
| 580 | Indexed | Boolean string, that is one of "true" and "false" |
|     | Total pages | Decimal numerical string that represents a nonnegative integer; 0 means the number of total pages is unknown other number means the number of total pages |
| 570 | Compressed | Boolean string |
| 560 | OCRed | Boolean string |
|     | Return receipt to | String that represents a URL |
|     | Fax number | Decimal numerical string |
|     | Mail from | String that represents an e-mail address |
|     | Mail to | String that represents an e-mail address |
|     | File to index | String that represents a file name without a directory |
|     | Thumbnail | Same as File to index |
|     | Copy of | Same as Serial number |

FIG. 5

```
<NOA_metadata
   <doc
610     <item name="FMA ID" value="2361738294" /
620     <item name="serial number" value="883639" /
630     <item name="document owner" value="jones" /
640     <item name="document capturer" value="jones" /
650     <item name="capture date" value="03/29/98 01:17:45 GMT" /
660     <item name="OCRed" value="true" /
670     <item name="compressed" value="true" /
680     <item name="indexed" value="true" /
660     <item name="backed up" value="37" /
   </doc
<NOA_metadata
```

FIG. 6

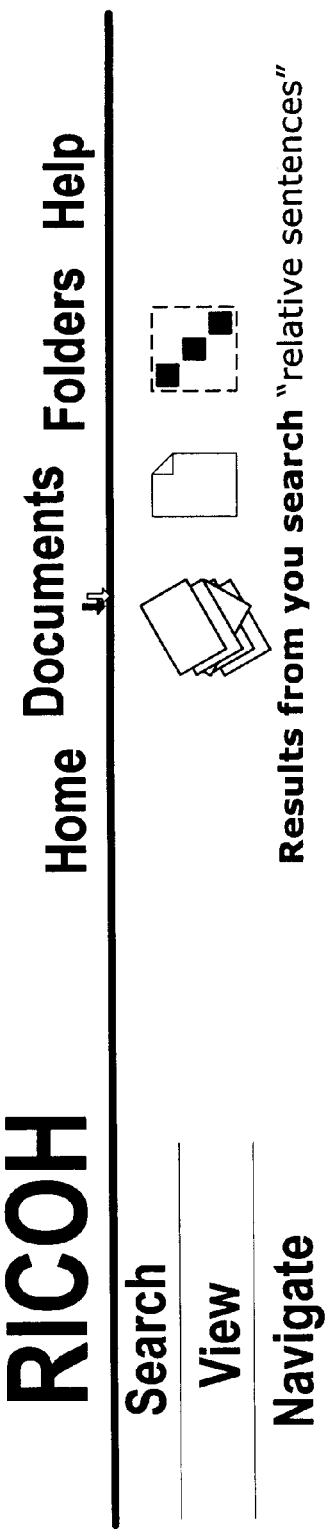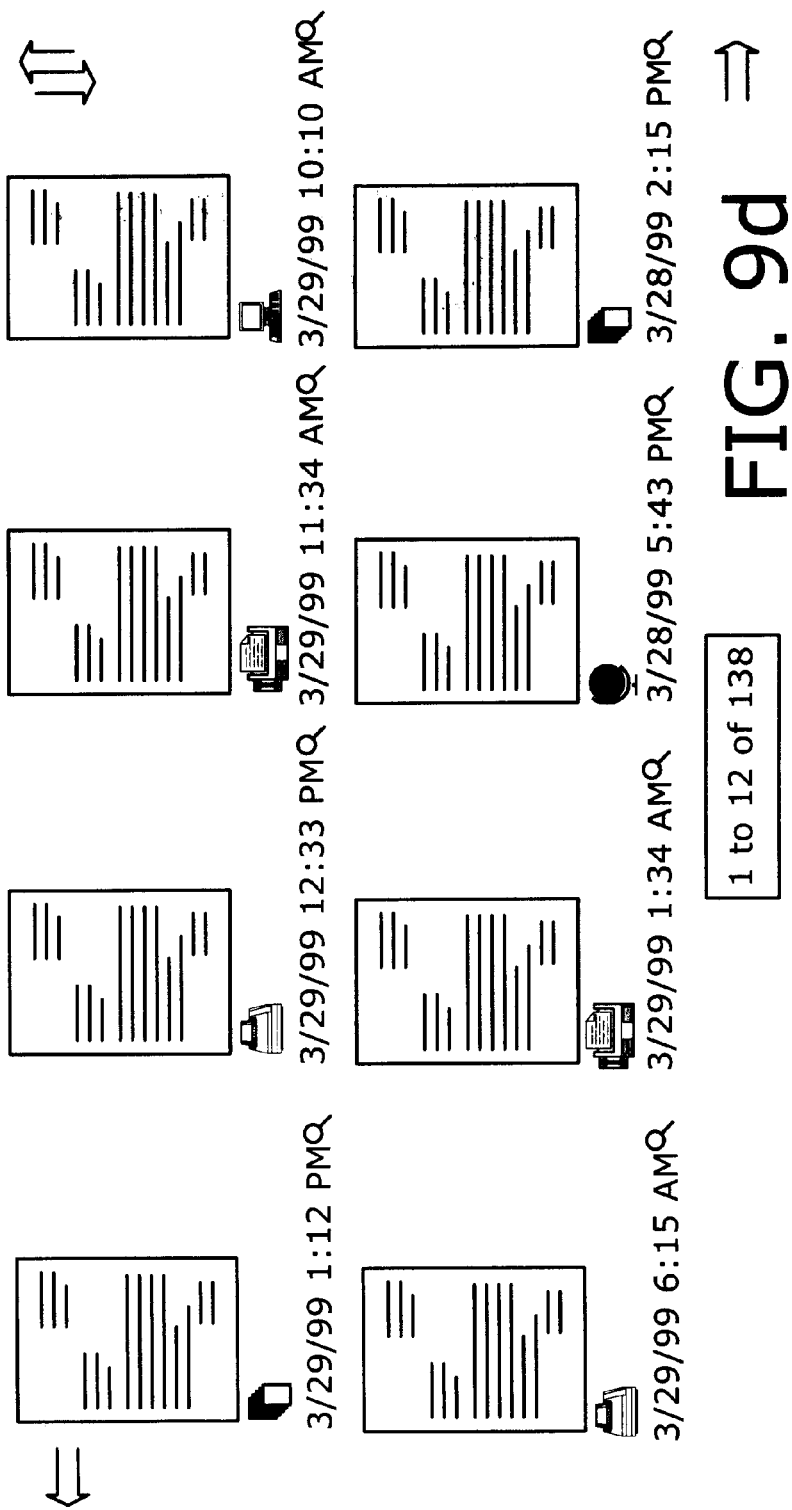
FIG. 9d

SYSTEM FOR TREATING SAVED QUERIES AS SEARCHABLE DOCUMENTS IN A DOCUMENT MANAGEMENT SYSTEM

This nonprovisional application is a continuation-in-part of copending nonprovisional application Ser. No. 09/410,362, filed Sep. 30, 1999, and entitled "Method and Apparatus for Electronic Document Management."

FIELD OF THE INVENTION

The present invention relates generally to data processing; more specifically, the present invention relates to a system for treating saved queries as searchable documents in a document management system.

BACKGROUND OF THE INVENTION

Electronic database systems are often utilized to organize and store various amounts of digital data for retrieval at some later date. In order to locate data stored within an electronic database system, users often formulate queries containing various search criteria that define the scope of the database search to be performed. For convenience, certain database application programs allow users to create and save queries, rather than requiring the queries to be reformulated prior to each execution. Although this may be useful for queries that may be executed multiple times, these saved queries typically contain fixed search criteria and are stored as part of the database application program. As such, these saved queries may work well with traditional structured electronic databases that contain consistent data sets, but prove to be limited when applied to electronic document databases.

An electronic document database is a special type of electronic database that indexes electronic representations of physical documents. Electronic document databases typically allow searching of the electronic documents contained within the database based on the full textual content of each document as well as additional structured information known as metadata. Queries formulated for searching electronic document databases often contain search criteria specific to document content, as well as document creation date and/or time ranges. Thus, such document queries are content, date, and time sensitive, and prove to be less useful when stored as part of a database application program rather than part of the database itself.

Other limitations with queries saved according to methods known in the art include the distribution and reuse of saved queries. Typically, a special mechanism, independent of the database, must be used to share queries between users of a database system. Such mechanisms often have problems controlling user access to the saved queries, thereby allowing inappropriate user access to the saved queries. Furthermore, queries saved according to methods known in the art do not provide users the ability to search for other existing saved queries that may be better suited to user's search than the user's own query.

SUMMARY OF THE INVENTION

A system and method for treating saved queries as searchable documents in a document management system is disclosed. In one embodiment, the method includes identifying a first database query to retrieve database objects, receiving comment data describing the first database query, forming a content-searchable database query from the first database query and the comment data, and storing the content-searchable database query as an objects within the database for later retrieval.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a table illustrating a first embodiment of an FMA metadata file format.

FIG. 5 is a table illustrating a second embodiment of an FMA metadata file format.

FIG. 6 illustrates one embodiment of an FMA metadata file in extensible markup language (XML) format.

FIG. 9D illustrate an exemplary FMA query results page showing a thumbnail view.

DETAILED DESCRIPTION

Figure 1:
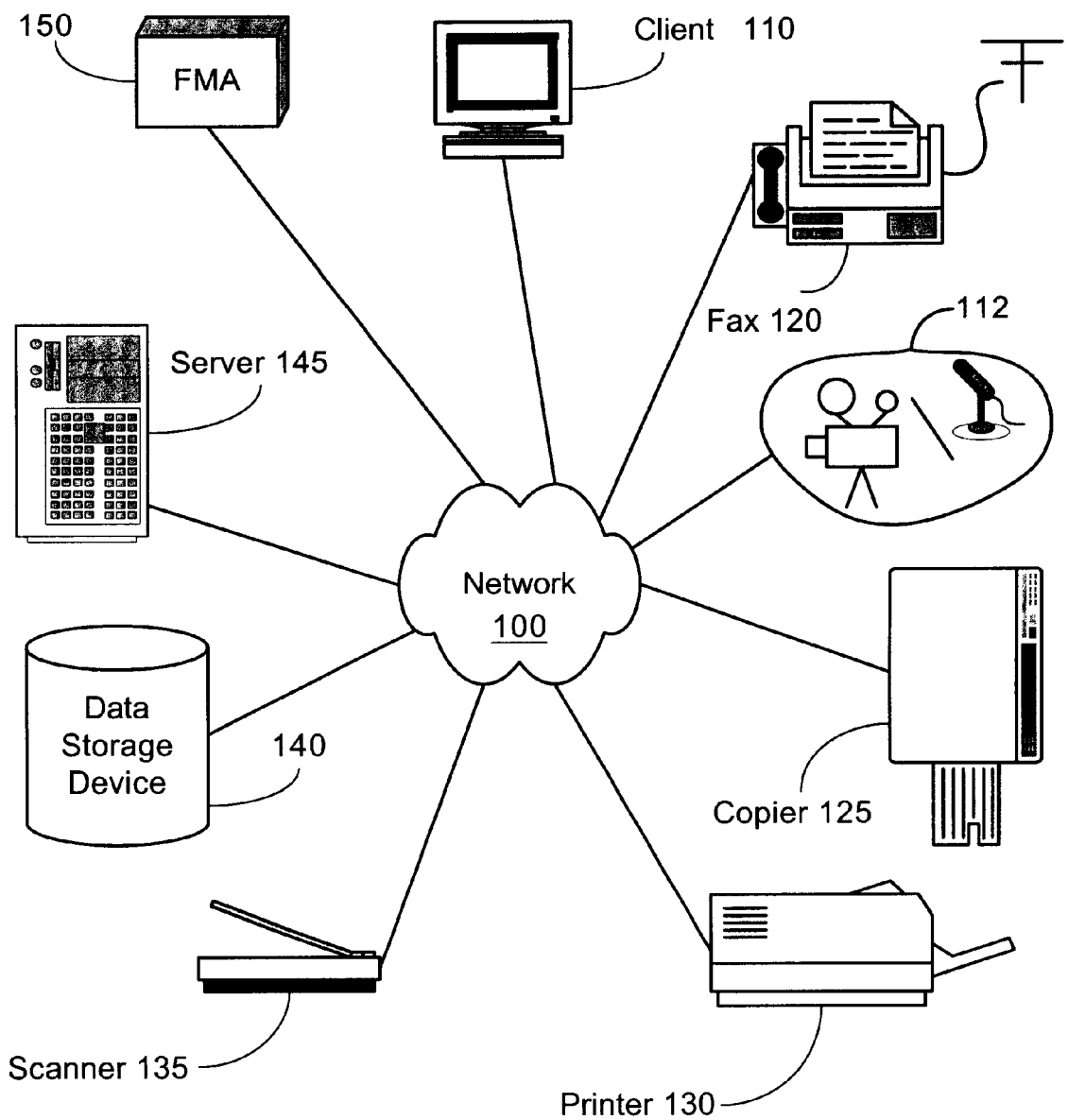
FIG. 1 illustrates one embodiment of a networked system containing an FMA.

A system for treating saved queries as searchable documents in a document management system is disclosed. In the following description, for purposes of explanation, numerous specific details are set forth in order to provide a thorough understanding of the present invention. It will be apparent, however to one skilled in the art that the present invention can be practiced without these specific details. In other instances, well-known structures and devices are shown in block diagram form to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for the reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, although the present invention may be described with reference to a particular programing language, it will be appreciated that a variety of programming languages may be used to implement the teachings of the invention as described herein.

Although all or some of the operations may be performed by software executing on one or more processing devices (e.g., CPUs), on a computer system or specialized apparatus, some or all of these operations may be performed by digital logic and/or circuitry, an integrated circuit (e.g., ASIC) or other semiconductor substrates.

System Overview

A system for treating saved queries as searchable documents in a document management system is disclosed. A file management appliance ("FMA") is a device that utilizes multiple processes and queues to provide document capture and indexing services as part of a document management system. Through the document capture and indexing services of the FMA system, documents are archived into one or more data storage devices, thereby forming a document database. One mechanism by which users may search for and access such archived data from one or more document databases is by formulating and submitting one or more queries to the FMA system. Queries formulated within the FMA system are treated as documents within the system. Accordingly, queries may be archived as documents within the document database for later retrieval and execution.

FIG. 1 illustrates a file management system according to one embodiment of the present invention. Client 110 represents a general purpose digital computer coupled to network 100. Network 100 may represent a local area network (LAN), an intranet, the Internet, or any other interconnected data path across which multiple devices may communicate. Also connected to network 100 is multimedia source 112, facsimile machine 120, copier 125, printer 130, scanner 135, data storage device 140, server 145, and file management applicant ("FMA") 150.

Multimedia source 112 represents one or more audio and video input devices connected to network 100. Multimedia source 112 may represent one or more microphones and/or video cameras that may provide both analog and digital data to network 100.

Facsimile machine 120 is connected to network 100 and represents a device capable of transmitting and receiving data such as text and images over a telephone line ("faxing"). In one embodiment, facsimile machine 120 may transmit text and images originating in printed form, or in another embodiment, facsimile machine 120 may transmit electronic data originating from any number of devices connected to network 100. Similarly, in one embodiment, facsimile machine 120 may print a hard copy of the received data, or in another embodiment, facsimile machine 120 may forward the received data to any number of devices connected to network 100.

Copier 125 represents a device capable of reproducing text and images. In one embodiment, copier 125 is a photocopier that reproduces printed text and images, whereas in another embodiment copier 125 is a photocopier that reproduces data received from any number of devices connected to network 100.

Printer 130 represents a device capable of converting electronic data into printed text and images, whereas scanner 135 represents a device capable of converting printed text and images into electronic data. In one embodiment, facsimile machine 120, photocopier 125, printer 130, and scanner 135 are each separate and distinct devices connected to network 100. In another embodiment, a multifunction peripheral device may replace any combination of these devices. It should also be noted that any number of devices may be omitted from or added to network 100 without parting from the spirit and scope of the present invention.

In one embodiment, as shown in FIG. 1, data storage device 140 is connected to network 100. In one embodiment, data storage device 140 represents a removable storage medium such as, for example, a CD-ROM, DVD-ROM, DVD-RAM, DVD-RW, or magnetic tape. In an alternative embodiment, data storage device 140 represents a non-removable storage medium such as a hard or fixed disk drive. In one embodiment, data storage device 140 is an archiving device.

Server 145 represents a general purpose digital computer connected to network 100 and is configured to provide network services to other devices connected to network 100. In one embodiment, server 145 provides file sharing and printer services to network 100. In another embodiment, server 145 is a Web server that provides requested hypertext markup language (HTML) pages or files over network 100 to requesting devices. In yet another embodiment, server 145 is a NOA server capable of providing configuration services to network 100.

FMA 150 is a file management appliance that is connected to network 100 and provides document capture, indexing, and query services. In one embodiment, FMA 150 is a device capable of providing configuration services in addition to document capture, indexing, and query services to network 100. In one embodiment, FMA 150 is not directly connected to any device, but rather is communicatively coupled to other devices through network 100. FMA 150 is equipped to publish its presence to other devices on network 100 using HTTP or other protocols.

Automatic document capture (or "unconscious capture"), which is discussed more fully below, is the process by which one device requests an archiving device, such as data storage device 140, to archive a document. In one embodiment, FMA 150 is the requesting device, however, other devices can also request archival of documents.

In the FMA environment, a document may comprise a single file. In one embodiment, the term document is used synonymously with the term "document directory" to represent these documents. A document may be composed of many distinct files of varying types, each representing at least the partial content of the document. A print job created on client 110 and intended for printer 130 could be captured, for example, as a thumbnail image, a postscript file, a portable document format (PDF) file, and an ASCII file containing extracted text. Additionally, FMA 150 is able to process multiple image file formats including the joint photographic experts group format (JPEG), graphics interchange format (GIF), and tagged image file format (TIFF) to name just a few. In one embodiment, each unique file type is represented by a corresponding unique file extension appended to the file's name. For example, a portable document format file may be represented as: filename.pdf, whereas a thumbnail image may be represented as: filename.thumb.

In one embodiment, FMA 150 is equipped to interpret compound filename extensions. For example, a file that contains thumbnail images in a tagged image file format may be represented asfilename.thumb.tiff. In an embodiment, FMA 150 uses the page number of the document as the filename. In such a manner, a document may be represented by multiple files located in the same directory, each representing a different page of the document as reflected by the filename. For example, 01.thumb.jpg would represent a thumbnail image of page number one in joint photographic experts group format. Similarly, 12.thumb.tiff would represent a thumbnail image of page number twelve in tagged image file format.

FMA 150 may index data captured from various devices connected to network 100 including printer 130, facsimile machine 120, client 110, and scanner 135. In one embodiment, facsimile machine 120 captures data over a telephone line and subsequently sends at least part of the received data to FMA 150 over network 100. In another embodiment, data sent from client 110 to facsimile machine 120 over network 100 is transparently (e.g., unbeknownst to the device) captured and at least part of the data is routed to FMA 150 for indexing. In an alternative embodiment, facsimile machine 120 is located internal to client 110 thereby eliminating the need for client 110 to send the facsimile data over network 100 in order to be captured. In such an embodiment, FMA 150 nonetheless receives at least part of the captured data. In one embodiment, FMA 150 receives bibliographic-type data, or "metadata" extracted from the document. In one embodiment, data received from facsimile machine 120 is composed in TIFF format, whereas data received from client 110 may retain its original format upon transfer.

The FMA capture process similarly applies to other devices connected to network 100 such as scanner 135 and copier 125. In one embodiment, if optical character recognition ("OCR") is performed on a scanned or copied document, FMA 150 creates two special OCR-related files. In one embodiment, contents.txt and contents.pdf are created and used by FMA 150 to index the full text of the document and return page images as a document file respectively.

In one embodiment, FMA 150 is capable of providing the same functionality as any one or more of the devices on network 100 thereby eliminating the need for these additional specialized devices. In another embodiment, however, FMA 150 is implemented as a thin server containing just enough hardware and software to support document capture and indexing over network 100.

Figure 2:
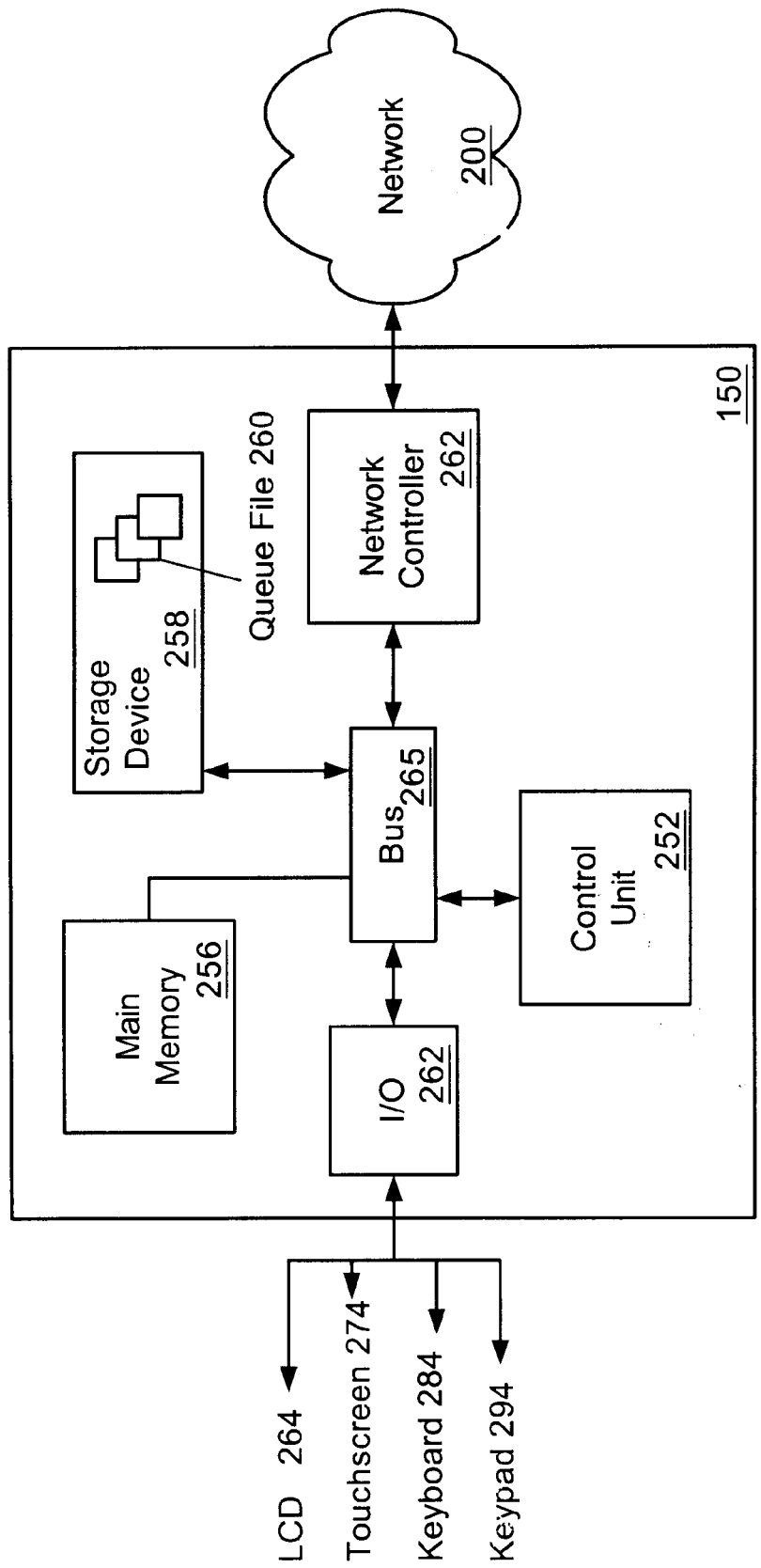
FIG. 2 is a block diagram illustrating an FMA hardware implementation according to one embodiment of the present invention.

FIG. 2 is a block diagram illustrating one embodiment of an FMA hardware implementation. Referring to FIG. 2, in one embodiment, FMA 150 includes control unit 252, I/O device 254, main memory 256, storage device 258 and network controller 262, all of which are connected through bus 265. Control unit 252 controls the overall operation of FMA 150 and may be implemented in any manner known in the art. In one embodiment, control unit 252 comprises a general purpose microprocessor known in the art to process data. Main memory 256 may be random access memory (RAM), read only memory (ROM), programmable read only memory (PROM), erasable programmable read only memory (EPROM), or any other memory device known in the art. In addition to main memory 256, FMA 150 may also contain a secondary memory unit (not shown). In one embodiment, FMA 150 utilizes a pared-down version of a UNIX-based operating system in which superfluous UNIX commands not required by FMA 150 are removed. In such an embodiment, control unit 252 extracts, decodes, and executes instructions from main memory 256. In one embodiment, FMA 150 may execute instructions in place within main memory 256.

I/O device 254 is connected to bus 265 and enables data input into and data output from FMA 150. I/O device 254 may be implemented using any general purpose input/output device known in the art. I/O device 254 may also be connected to any number of display devices such as liquid crystal display 264 or touch-sensitive screen 274, as well as any other display device not depicted in FIG. 2, but nonetheless known in the art. I/O device 254 may also be connected to any number of data input devices known in the art. FIG. 2 shows keyboard 284 and keypad 294 connected to I/O device 254, but any other general purpose input device may be connected in addition to, or in place of keyboard 284 and keypad 294. In one embodiment, I/O device 254 is internal to FMA 150 as shown in FIG. 2. In another embodiment, I/O device 254 may be external to FMA 150.

Network controller 262 is connected to bus 265 to enable FMA 150 to communicate over network 200. Network controller 262 may be implemented as a network interface card, an application specific integrated circuit (ASIC) or in any other manner known in the art so as to provide network connectivity to FMA 150. In one embodiment, as shown in FIG. 2, network controller 262 is internal to FMA 150. In another embodiment, network controller 262 may be external to FMA 150.

Storage device 258 is connected to bus 265 and represents any nonvolatile memory device known in the art. Storage device 258 may utilize a removable storage medium such as a CD or DVD, or storage device 258 may utilize a non-removable storage medium such as a hard/fixed disk. Queue file 260 (discussed in more detail below) represents documents stored in an ordered manner on storage device 258.

Queues

In one embodiment, the FMA operating environment enables a number of simultaneously executing processes or daemons to operate on one or more processing queues. The FMA uses a combination of files and directories, also referred to as documents, to form such queues. In one embodiment a queue file, such as queue file 260, contains a list of document locations each separated by a new line character.

Figure 3:
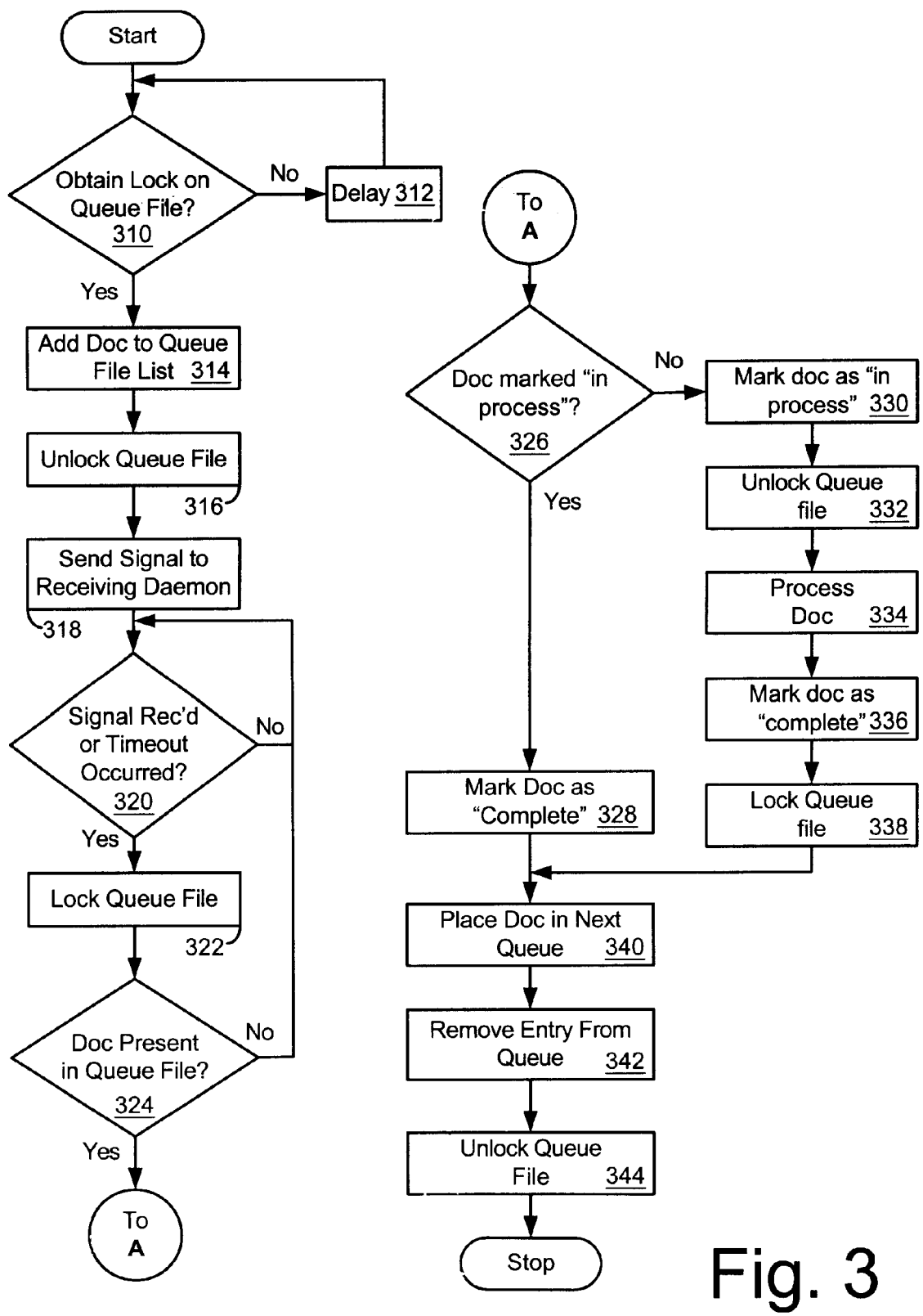
FIG. 3 is a flow diagram illustrating one embodiment of FMA queue processing.

FIG. 3 is a flow diagram illustrating one embodiment of FMA queue processing. Referring to FIG. 3, FMA 150 first attempts to obtain a lock on a receiving queue file (processing block 310). In one embodiment, FMA 150 uses a metadata file (discussed more fully below) to indicate whether the lock on the receiving queue file may be obtained. If FMA 150 is not able to obtain a lock on the receiving queue file or its corresponding metadata file, FMA 150 delays a predetermined amount of time (processing block 312) before attempting to obtain a lock on the receiving queue file once again (processing block 310). Once FMA 150 is able to obtain a lock on the receiving queue file, FMA 150 then adds the document to the receiving queue file's list of documents (processing block 314). After completing the document addition, FMA 150 unlocks the receiving queue file (processing block 316) and signals the receiving daemon that there are entries in the receiving queue file waiting to be processed (processing block 318).

When the receiving daemon detects such a signal indicating the presence of a document in the receiving queue file, or alternatively, if a timeout occurs prior to the receiving daemon detecting such a signal (processing block 320), the receiving daemon locks the receiving queue file (processing block 322) and determines whether, in fact, there is a document present in the receiving queue file for processing (processing block 324). If no documents are present in the receiving queue file, the receiving daemon returns to a sleep mode where it once again waits for either a signal indicating the presence of a document in the receiving queue file, or for a timeout to occur. If, however, a document is present in the receiving queue file (processing block 324), the receiving daemon then determines whether that document is marked as being "in process" (processing block 326). If the document is marked as being "in process", there is a chance that a previously executed daemon process had terminated prematurely, and the receiving daemon therefore marks the document as "complete" without processing the document (processing block 328). If, however, the document was not marked as "in process" (processing block 326), then the receiving daemon marks the document as "in process" (processing block 330), unlocks the receiving queue file (processing block 332), and continues to process the document normally (processing block 334). After processing the document, the receiving daemon marks the document as "complete" (processing block 336) and proceeds to lock the receiving queue file once again (processing block 338). Once the document is marked as "complete" (whether from processing block 328 or processing block 336), the receiving daemon places the document into the next queue (processing block 340) and removes the document entry from the receiving queue (processing block 342). Lastly, the receiving daemon unlocks the receiving queue file (processing block 344) to allow further document processing.

Metadata

In one embodiment, each document captured within an FMA system is stored on the FMA as a separate UNIX directory that includes a metadata file. In one embodiment, the metadata file contains special information about the document such as, for example, bibliographic data extracted from the capturing device. In one embodiment, document metadata consists of pairs of attribute names and their values.

FIG. 4 is a table illustrating one embodiment of an FMA metadata file. In FIG. 4, document metadata attributes are listed along with each attribute's meaning.

FIG. 5 is a table illustrating a second embodiment of an FMA metadata file. In FIG. 5, document metadata attributes are listed along with their acceptable value types.

FIG. 6 illustrates one embodiment of an FMA metadata file in extensible markup language (XML). The partial metadata code depicted in FIG. 6 is illustrative of what might be produced for a document that was captured by user "jones" (line 640), is owned by user "jones" (line 630), has Ser. No. "883639" (line 620), and was archived or "backed up" (line 690). Furthermore, the metadata code shown in FIG. 6 shows that the document was processed by OCR and compression (lines 660 and 670), was indexed (line 680), and was backed up to disk 37 (line 690).

In the event that an FMA encounters a metadata file that is not well-formed (as defined by the XML specification available from the World Wide Web Consortium (W3C) at http://www.w3.org), then in one embodiment, that FMA replaces the metadata with a well-formed file which includes all information it can verify about the document. This might result in a completely empty metadata file that is well-formed but contains no attribute/value pairs. Although in one embodiment, the metadata files and data field definitions represented in FIGS. 4, 5 and 6 are implemented according to the XML specification, other programming language implementations may equivalently be utilized such as, for example, HTML, extensible hypertext markup language (XHTML), standard generalized markup language (SGML) or any other language known in the art to provide similar functionality. In one embodiment, in order to add or remove items from the metadata file, the FMA uses a small software library or routing to parse the metadata file as well as perform file locking, reading, writing, and deletion tasks for documents or items of metadata.

The FMA may also maintain a master document list that manages documents on the FMA. In one embodiment, the master document list is a single repository that points to information about all documents that have ever been captured on the FMA. In one embodiment, the master document list maintains the same attributes as are found in the metadata file shown in FIGS. 4, 5 and 6. Any database capable of content indexing may be used to implement the master document list.

Document Capturing

Document capture is an operation in which a device (e.g. FMA 150) requests an archiving device (e.g. data storage device 140) to archive a document. The performance of document capture, however, is not limited to any specific network entity or device. In one embodiment, document capture is automatically performed upon all documents within an FMA system, whereas in another embodiment, only selected documents are captured in response to a user setting. For example, the user may press a button that prevents documents from being automatically captured. In one embodiment, document capture utilizes standard Internet protocols enabling the capture of multiple documents, or multiple files associated with a single document.

In one embodiment, HTTP is used as the capture protocol. Using the HTTP POST operation, for example, files of various formats including archive formats, may be captured by the FMA. Such archived files may contain collections of distinct named data files or data blocks, and may comprise archive formats such as the tape archive (tar) format, the zip, gzip and pkzip formats, the StuffIt format, and the like.

In another embodiment, an implementation of the Internet File Transfer Protocol (FTP) is used as the capture protocol, whereby documents are captured either as multipurpose Internet mail extension (MIME) files in the default FTP directory, or as subdirectories of the default directory. The actual name of the document directory is not important during document capture since the name of the document is not stored as part of the directory system, but is instead stored within the metadata file. In one embodiment, the document's capture date is used for the name of the document directory. In addition, a unique identifier, such as a serial number, may be assigned to each document and stored in the document's metadata file (shown in FIGS. 4, 5 and 6 as 420, 520, and 620 respectively).

Figure 7A:
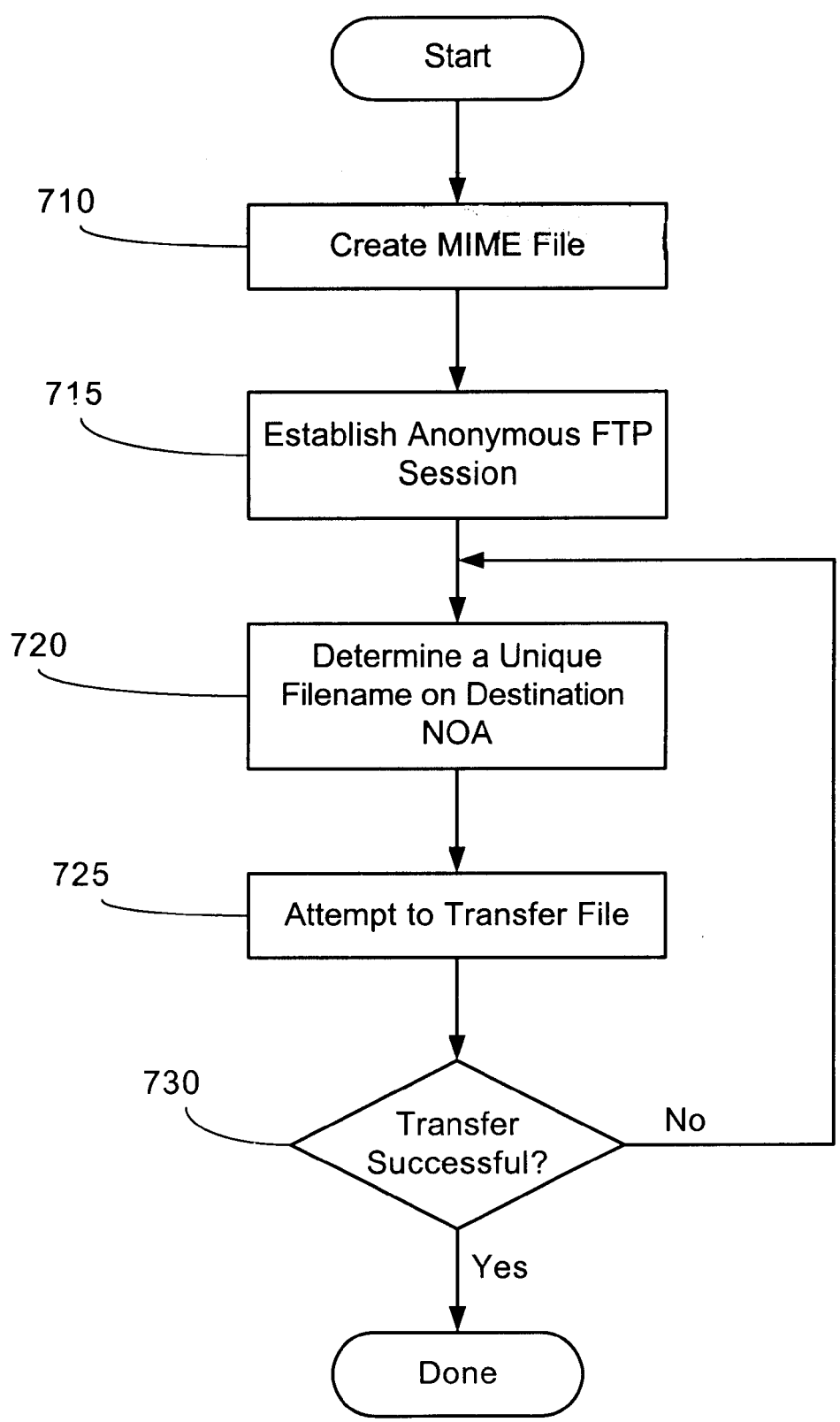
FIG. 7A is a flow diagram illustrating one embodiment of MIME capturing in an FMA environment.

FIG. 7A illustrates a flow diagram of one embodiment of MIME capturing used in one embodiment of an FMA environment. Referring to FIG. 7A, a capturing device creates a MIME multi-part file, including one or more content files and a metadata file (processing block 710). After creating the MIME file, the capturing device then attempts to establish an anonymous FTP session with the destination device (processing block 715). Once an FTP session is established, the capturing device determines a filename that is a unique on the destination device (processing block 720) and attempts to transfer the file to the destination device (processing block 725). If the transfer fails, the capturing device obtains a new filename and attempts the file transfer again. The capture is complete upon a successful file transfer (processing block 730).

Figure 7B:
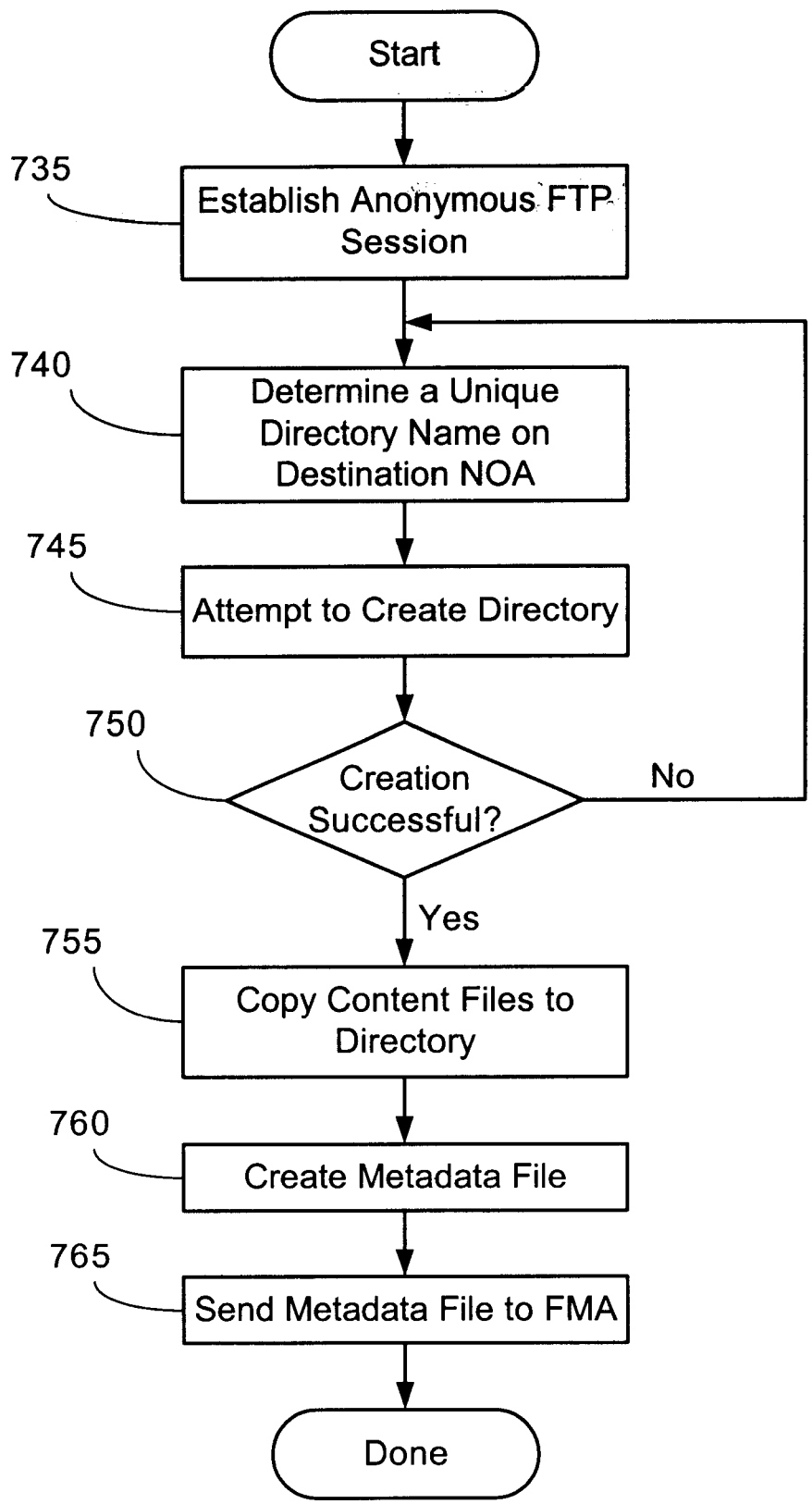
FIG. 7B is a flow diagram illustrating one embodiment of directory capturing in an FMA environment.

FIG. 7B illustrates a flow diagram of one embodiment of directory capturing in one embodiment of an FMA environment. Referring to FIG. 7B, the capturing device establishes an anonymous FTP session with the destination device (processing block 735). Once the FTP session is established, the capturing device determines what it assumes to be a unique directory name (to be more fully discussed below) on the destination device (processing block 740). Once a directory name is determined, the capturing device attempts to create a directory with that name on the destination device (processing block 745). If the attempt to create the directory is unsuccessful, whether due to a duplicate directory name or otherwise, the capturing device determines another directory name and attempts to create the directory again (processing blocks 750, 740 and 745). If, however, the capturing device successfully creates the directory on the destination device (processing block 750), the capturing device then copies the content file or files to the newly created directory (processing block 755). The capturing device also creates a metadata file (processing block 760) which is then sent to the FMA device (processing block 765) to complete the process.

Figure 7C:
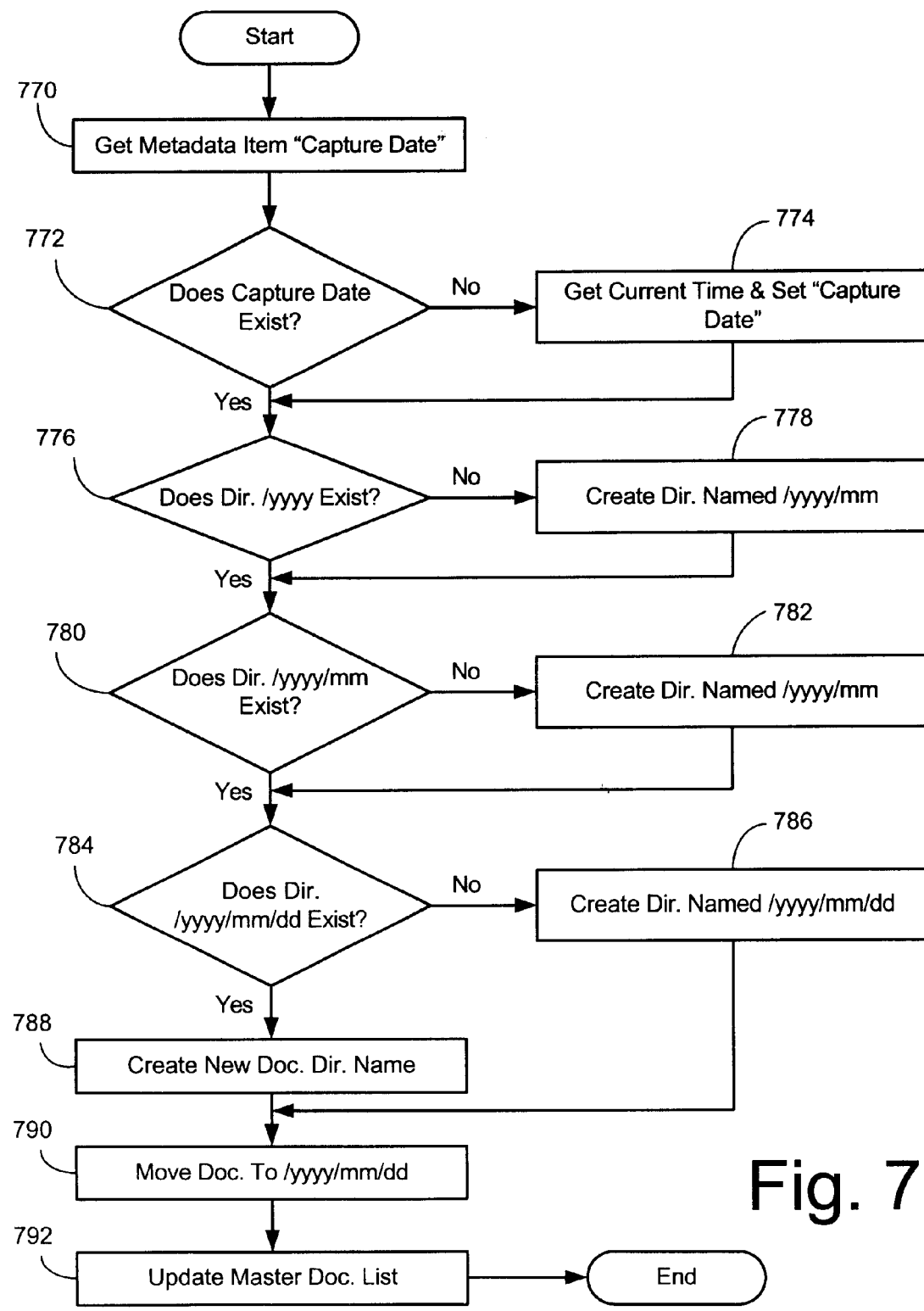
FIG. 7C is a flow diagram illustrating one embodiment of the document storage process in an FMA environment.

FIG. 7C illustrates a flow diagram of one embodiment of the document storage process in an FMA environment. During the document storage process, the FMA creates appropriate directories, moves the document to the appropriate directory, and updates the master list. Referring to FIG. 7C, the metadata file of the document to be stored is accessed and information from its "Capture date" field (see items 450 and 550 in FIGS. 4 and 5 respectively) is retrieved (processing block 770). If the document's "Capture date" or even the metadata file does not exist, then the current system time is obtained and used as the document's "Capture date" (processing block 774). If, however, the document's "Capture date" does exist, the system determines whether an appropriately named directory exists. In one embodiment the document directory is represented by "yyyy/mm/dd" where yyyy represents the year in which the document was created, mm represents the ordinal month in which the document was created, and dd represents the day of the month in which the document was created. Referring once again to FIG. 7C, the system determines whether a directory exists as reflected by the appropriate four-digit year (processing block 776). If a directory reflecting the appropriate year does not exist, the system creates such a directory (processing block 778). If a directory reflecting the appropriate year does exist, however, the system then checks whether a directory reflecting the appropriate month exists within that year directory (processing block 780). If the appropriate month directory does not exist within the year directory, the system creates a month directory within the year directory (processing block 782). If the appropriate year and month directories exist, the system finally checks whether the appropriate day directory exists within the nested year/month directory (processing block 784). If the day directory does not exist, the system creates the appropriate day directory within the year/month directory (processing block 786). If, however, a directory reflecting the appropriate year, month and day already exists, the system creates a new document directory name into which the document will be stored. In one embodiment, the system generates a four-digit random number that gets appended to the end of the existing document directory name (processing block 788). Once a unique document directory name is established (processing blocks 786 and 788), the document is moved to that directory (processing block 790) and the master document list is updated to reflect the document's new location (processing block 792).

Document Ownership

In an FMA system, various access control or ownership properties may be individually or commonly assigned to documents so as to regulate user access to certain documents. A document owner is usually considered to have the most freedom with respect to access and control of a given document. An owner of a document on an FMA, for example is permitted to perform various operations with respect to that document including, viewing the document, changing the ownership of the document, expunging the document, and copying the document to another owner. Due to the breadth of control an owner has over a particular document, access to the files on the FMA is controlled under a "single owner" model of ownership. That is, every document contains an owner field that specifies which user or users are allowed to access or view the document. Owners on the FMA may be designated as individual users or may be designated as groups of users. If a group is specified as the owner of a document, then every member of that group is treated as the owner of the file. In one embodiment, each document on the FMA may be designated as being public, whereby ownership of the document is not changed but all users are allowed to view the document. In one embodiment, the user and group name space used for ownership access is the same user and group name space used to provide HTTP authentication to the web server.

Queries

Through the document capture and indexing services of an FMA-based system, documents are archived into one or more data storage devices such as, for example, data storage device 140. In one embodiment, an archive of electronic documents is referred to as a document database wherein each document contained within the database is represented by one or more electronic data objects. One mechanism by which users may search for and access such archived data from one or more document databases is by formulating and submitting one or more queries to the FMA system. In one embodiment, FMA queries are formulated using various search criteria to define the scope of the database search to be performed. In one embodiment, the search criteria is user-specified, whereas in another embodiment the search criteria may be automatically generated by the FMA or similar device. In one embodiment, each of the various metadata attributes of the FMA, such as those shown in FIGS. 4 and 5, are indexed by the FMA and may be specified within a query to be searched. It should be noted that, however, in one embodiment, items within the document database need not be indexed in order to be searched.

Queries within an FMA system are treated as documents within the FMA document database and accordingly may be archived within the database for later retrieval and execution. In one embodiment, metadata files, similar to those associated with non-query documents, are created for and associated with each saved query document. Such metadata files may include searchable attributes describing various query properties such as, for example, who formulated the query, the date and time the query was formulated, the date and time the query was most recently executed or updated, and so forth. Thus, by treating queries as documents, the queries themselves become searchable data objects stored within the database.

Given the large number of documents that may be stored within an FMA-based system, as well as the flexibility one is afforded when formulating queries in such a system, it is easy to imagine that the number of documents returned by the FMA from one search to another may vary greatly. Furthermore, even though a given query may result in a large number of documents that match the stipulated search criteria, it does not necessarily follow that all such documents returned by the FMA will be considered relevant to the user. If a query proves to be particularly useful to a user, the user may wish to save the query for further use at a later date. The user may, at a later date, simply re-execute the query in its current form, or more likely, the user may wish to modify the query by changing or supplementing the search criteria prior to its re-execution. In one embodiment, the FMA provides a way for which users may execute, save, update, and re-execute database queries.

In the event a query returns a large number of documents, the user may wish to sort through the documents to identify those that are most relevant according the user's needs at the time. Unfortunately, without the presence of some form of descriptive information identifying the contents of each document, a user may inadvertently overlook one or more relevant documents. Although a document title may provide at least some insight into the associated non-query document's content, query documents represent a class of documents that may not effectively be summarized through a simple title. In one embodiment, the FMA system provides a mechanism for users to attach descriptive comment data to queries so as to facilitate database searching. For instance, a user may wish to enter an amount of text summarizing various aspects of a given query including, for example, why a particular set of search criteria was chosen, the search topic, and so forth. In one embodiment, comment data is used to describe both newly formulated queries as well as preexisting query-documents. Comment data, however, is not limited in form to just text data. In one embodiment, comment data may include data formats other than text data including for example, audio data, digital image data, and motion video data. In one embodiment, comment data within the FMA system is both indexed and searchable.

Figure 8:
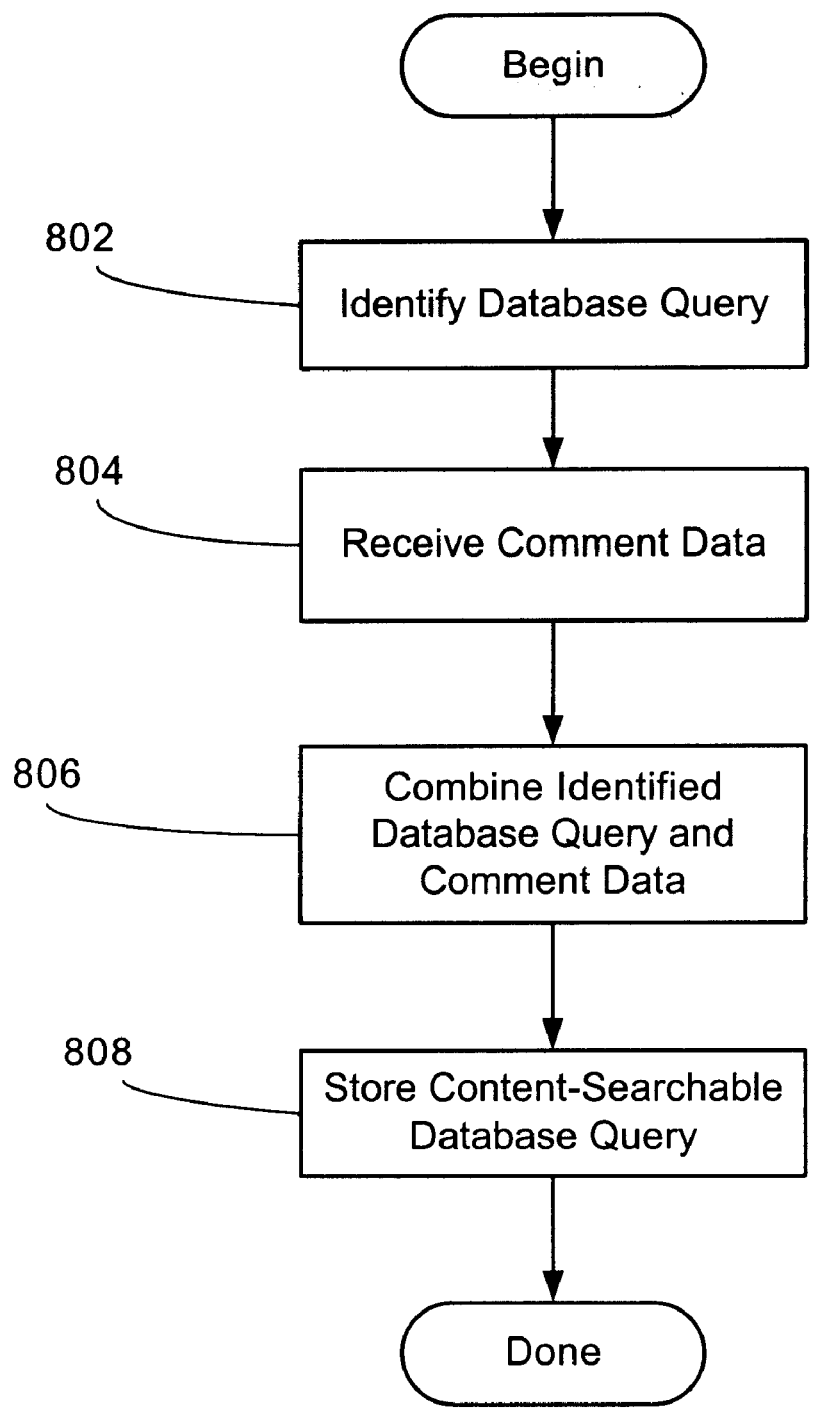
FIG. 8 is a flow diagram of one embodiment of a process for creating and archiving content searchable query-documents within a system.

FIG. 8 is a flow diagram of one embodiment of a process for creating and archiving content searchable query-documents within a system, such as an FMA-based system. The process may be performed by hardware, software, or a combination of both. The software may be executed on a general purpose computer system or a dedicated machine.

Referring to FIG. 8, at processing block 802, a database query is identified. In one embodiment, the identified database query is a newly-formulated query, whereas in another embodiment the identified database query may be a preexisting query already archived within the FMA system. Similarly, in one embodiment, a user may identify the database query, whereas in another embodiment, the system may identify the database query without user intervention. Once a database query is identified, the system receives comment data describing the identified database query at processing block 804. At processing block 806, the identified database query is combined with the received comment data to form a single query document. In one embodiment, the comment data is appended to the identified database query, whereas in another embodiment, the comment data is linked to the database query as a separate data object. In a further embodiment, both the comment data and the database query are converted into a graphical markup-language representation, such as HTML code for example, and combined to form a document. At processing block 808, the combined database query and comment data is archived back into the FMA document database rendering the newly formed query-document and accompanying comment data searchable as a single document.

By treating queries like documents within the FMA, a number of additional advantages not yet discussed may further be realized. One such advantage involves the management of stored queries. Because queries within the FMA are treated as independent data objects, each of the query documents may be stored according to a variety of organizational schemes supported by the database. For example, query documents may be grouped together and archived by content, or the queries may be grouped by various file attributes including query name, creation date and time, and last execution date and time. Alternatively, queries may stored independently rather than being stored according to specified groupings.

Queries may also be assigned and/or inherit specific or default access control and ownership properties as described above with respect to non-query documents (See Document Ownership above). By utilizing the access control and ownership properties of the FMA for query-documents, query-documents may be hidden from some users, or be made public or distributed to other users of the FMA system. If, for example, a user formulates a query that she wishes to archive but does not wish others to be able to access, the user may assign certain attributes to the query-document making the query-document private and hidden from others. Alternatively, a user may also assign certain attributes to query-documents so as to make the query-documents publicly accessible. In one embodiment all query-documents formulated on the FMA are treated as public documents unless a user otherwise makes the query-document private.

In one embodiment, query-documents that are made publicly accessible are also publicly searchable. As such, it is possible for users to execute queries and in response, be provided with a list of documents including publicly accessible query-documents that match the specified search criteria. Upon reviewing the list of documents returned by the FMA, a user may decide that a preexisting query formulated by another user better suits the user's needs than does the user's own query. Accordingly, the user may execute the preexisting query rather than, or in addition to, executing their own query. In one embodiment, the FMA enables users to perform subsequent queries on any set of documents resulting from a first query. Thus, a user may generate, for example, a time-oriented query based on the results of a content-oriented query and conversely, a user may generate a content-oriented query based on the results of a time-oriented query. Additionally, a user may not want to generate a new query, but rather make an adjustment to a previous query. In one embodiment, a user can return to a previous query containing previously submitted field entries and reform the query by entering the appropriate search criteria.

The FMA additionally provides a mechanism by which a user may add selected documents, including documents resulting from a query and query documents themselves, to a repository or "stack" for later viewing. In one embodiment, the FMA adds documents to a stack by writing each document's identification or serial number contained within the document's metadata file to the end of a stack contents file. In one embodiment, if a saved query is added to the stack, an HTML page representing the query is appended to the stack. Stack contents may be displayed in a manner similar to which document query results are displayed, such as, for example the list view described below.

One or More Exemplary Embodiments of Web & User Interfaces

The FMA utilizes a variety of graphical input and display pages to form the FMA user interface. In addition, the FMA is equipped with a graphical web-based interface that enables the FMA to send and receive data over a network connection.

In one embodiment, the FMA uses CGI scripting to generate one or more web pages to display specific query results. FMA query results may be graphically displayed in a variety of time-oriented views such as, for example, a list view and a calendar view, or in a variety of content-oriented views such as, for example, a stream view and a thumbnail view. In one embodiment, a user may selectively alternate between each query result view depending upon the document display preferences.

Figure 9A:
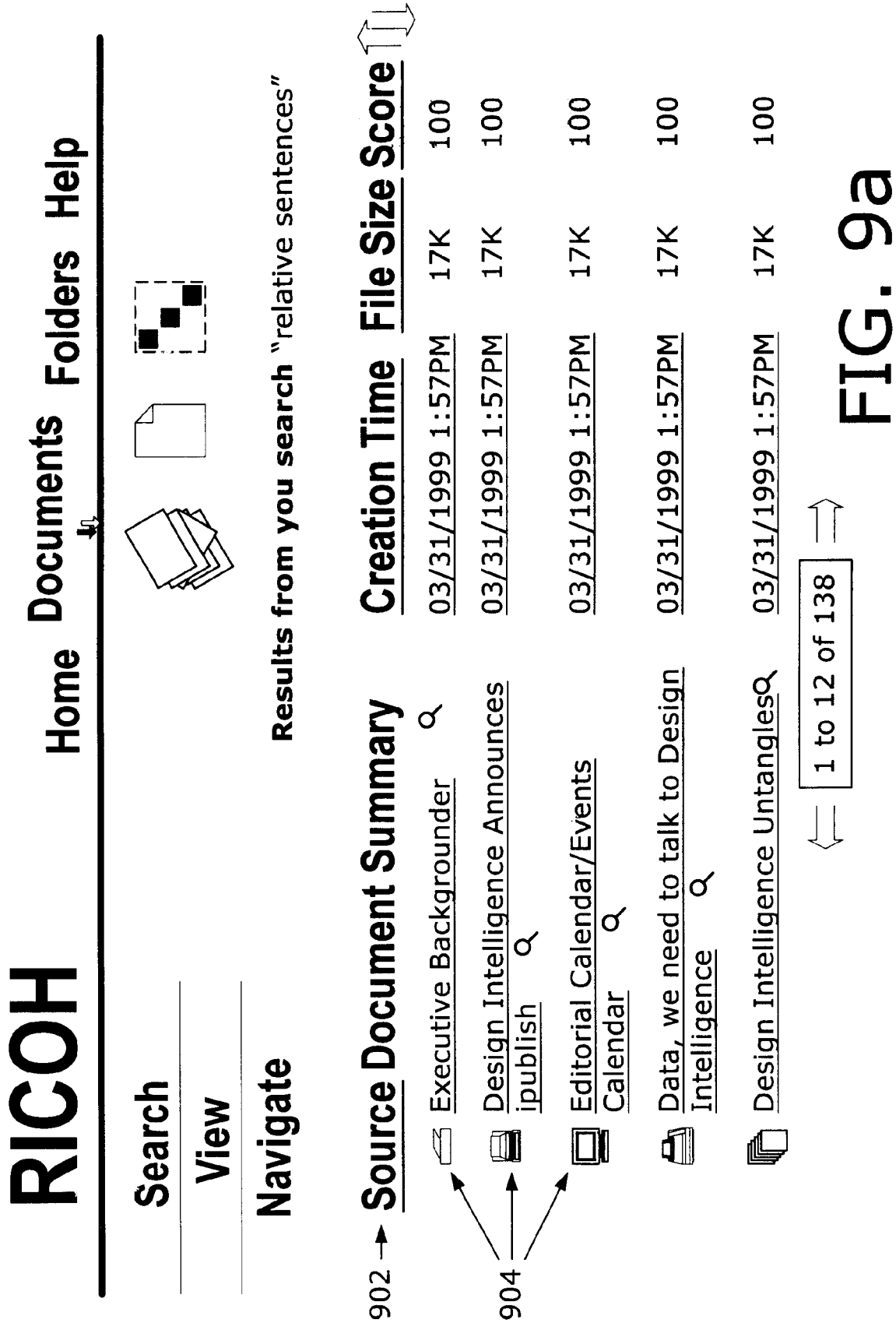
FIG. 9A illustrates an exemplary FMA query results page showing a list view.

The list view of the present invention enables large quantities of textual information about many documents to be communicated to a user. FIG. 9A illustrates one embodiment of an FMA query results page showing a list view. Referring to FIG. 9A, a listing of documents satisfying a query of "relative sentences" is shown. Within the list view, query results may be sorted by a variety of criteria such as, for example, creation source (the device that created or captured the document), creation time, file size, and search result score, all indicated by reference number 902. Source icons 904 graphically indicate to a user the device through which the associated document was created or captured. In one embodiment, a particular document's capture source is identified within the document's metadata file (shown by reference numbers 445 and 545 in FIGS. 4 and 5 respectively). In one embodiment, if a user double clicks on a source icon or associated document, the document is retrieved via FTP to the users machine.

Figure 9B:
FIG. 9B illustrates an exemplary FMA query results page showing a calendar view.

In one embodiment, the calendar view provides a view of query results that is formatted to resemble a standard monthly calendar. The calendar view provides users with an event-based view of particular query results and may also serve as a document density indicator of activity. In one embodiment icons representing captured documents are graphically displayed in a location on the calendar corresponding to the day upon which they were captured. In such an embodiment, the number of icons that are displayed for a given date on the calendar corresponds to the number of documents that were captured on that date. In other embodiments, documents or icons representing documents may be displayed on the calendar according to their creation date rather than capture date, or according to both their creation dates and capture dates. FIG. 9B illustrates one embodiment of an FMA query results page showing a calendar view. In one embodiment, if a user points to a document source icon while in the calendar view, a thumbnail version of the document is displayed as an inset within the screen. Likewise, if a user selects a particular icon by "double clicking" on the icon for example, the document is downloaded.

Figure 9C:
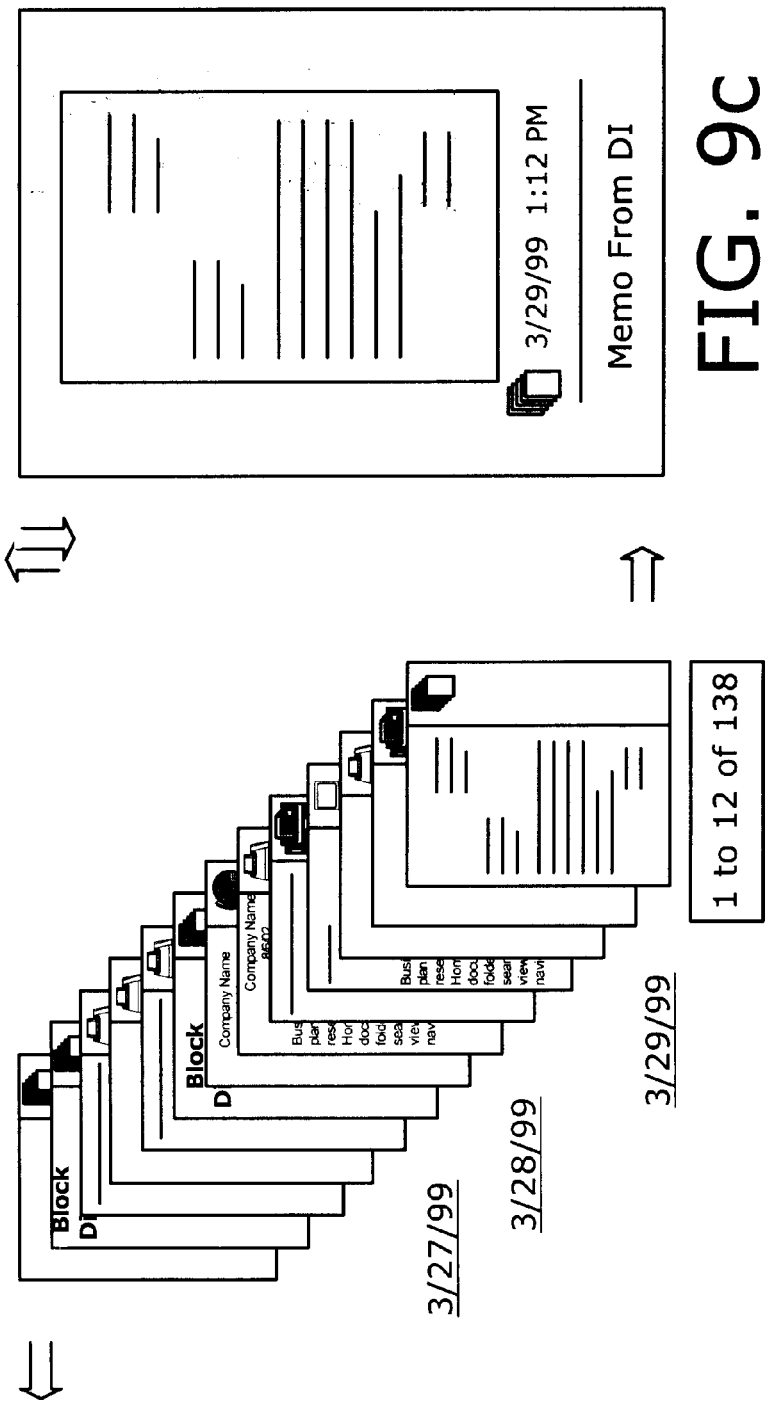
FIG. 9C illustrate an exemplary FMA query results page showing a stream view.

The stream view of the present invention presents query results as a graphical stream of documents arranged by time of capture. In one embodiment, the first page of each resulting document and its corresponding capture date are graphically displayed a tiled manner whereby each document is slightly offset from each other document. In one embodiment, the capture date is a hyperlink that when selected, causes the FMA to display a new page containing documents that were captured on the selected date. In one embodiment, a secondary document view is also provided, whereby when a document is selected in the stream view, a magnified version of the document is displayed along with summary information in an accompanying window upon the display. FIG. 9C illustrates one embodiment of an FMA query results page showing a stream view. In one embodiment, the thumbnail view is similar to the stream view described above. In one embodiment, the thumbnail view graphically displays the first page of each resulting document as a thumbnail image. In one embodiment, the thumbnail images are displayed side-by-side within the thumbnail view. FIG. 9D illustrates one embodiment of an FMA query results page showing a thumbnail view.

Note that the processing performed herein is performed by processing logic, which may comprise hardware (e.g., dedicated logic, circuitry, etc.), software, or a combination of both.

Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the cope of the claims which in themselves recite only those features regarded as essential to the invention.

What is claimed is:

1. A method comprising:

identifying a database query to retrieve from database objects that satisfy the database query, wherein the database stores one or more archived electronic documents;

forming a content-searchable query document from the database query;

receiving comment data describing the database query; and incorporating the comment data into the content-searchable query document, wherein at least a portion of the comment data is used as searchable text for the later retrieval;

storing the content-searchable query document as an object within the database for later retrieval, wherein the object corresponding to the content-searchable query document is suitable to be managed by the database, as a part of the one or more archived electronic documents in accordance with a management scheme of the database.

2. The method of claim 1, further comprising:

retrieving the content-searchable query document from the database in response to a second document database query, the second document database query being in a form compatible with the database;

incorporating additional information into the content-searchable query document; and optionally storing the content-search query document having the additional information in the database in accordance with the management scheme of the database.

3. The method of claim 2, further comprising:

executing the content-searchable query document to retrieve additional document database objects, wherein the additional document database objects are retrieved based in part on at least a portion of the additional information incorporated within the content-searchable query document.

4. The method of claim 2, wherein at least one of the database query, the second database query, and the content-searchable query document are HTML-formed queries.

5. The method of claim 1, wherein identifying a database query includes receiving as input a newly formed document database query.

6. The method of claim 1, wherein identifying a database query includes retrieving a pre-formed query from another content-searchable document stored in the database.

7. The method of claim 1, wherein forming the content-searchable query document comprises generating a graphical representation of the database query and the comment data describing the database query.

8. The method of claim 7, wherein the graphical representation comprises at least one of a plurality of web-based markup languages including HTML, XHTML, XML, and SGML.

9. The method of claim 1, wherein storing the content-searchable query document as an object within the database for later retrieval includes:

assigning to the content-searchable query document, access control attributes indicating which of a plurality of users may access the content-searchable query document within the database, wherein the access control attributes are compatible with one or more security policies of the database, which are applied to the one or more archived electronic documents.

10. A machine readable medium having stored thereon a plurality of instructions that, when executed by one or more processors, cause the one or more processors to:

identify a first document database query to retrieve document database objects from a database, the database storing one or more archived electronic documents;

form a content-searchable query document from the first document database query;

receive comment data describing the first document database query;

incorporate the comment data with the content-searchable query document, wherein at least a portion of the comment data is used as searchable text for the later retrieval; and store the content-searchable query document as an object within the database for later retrieval, wherein the object corresponding to the content-searchable query document is suitable to be managed by the database, as a part of the one or more archived electronic documents in accordance with a management scheme of the database.

11. The machine readable medium of claim 10, further comprising instructions that, when executed by the one or more processors, cause the one or more processors to:

retrieve the content-searchable query document from the document database in response to a second document database query in a form compatible with the database, incorporate additional information into the content-searchable query document, and optionally store the content-searchable query document having the additional information in the database in accordance with the management scheme of the database.

12. The machine readable medium of claim 11, further comprising instructions that, when executed by the one or more processors, cause the one or more processors to:

execute the content-searchable query document to retrieve additional document database objects, wherein the additional document database objects are retrieved based in part on at least a portion of the additional information incorporated within the content-searchable query document.

13. The machine readable medium of claim 11, wherein at least one of the first document database query, the second document database query, and the content-searchable query document is an HTML-formed query.

14. The machine readable medium of claim 10, wherein the instructions to identify a first document database query further comprise instructions to receive as input a newly formed document database query.

15. The machine readable medium of claim 10 wherein the instructions to identify a first document database query further comprise instructions to retrieve a pre-formed query from another content-searchable document stored in the database.

16. The machine readable medium of claim 10, wherein the instructions to form the content-searchable query document further comprise instructions to generate a graphical representation of the first document database query and the comment data describing the first document database query.

17. The machine readable medium of claim 16, wherein the graphical representation comprises at least one of a plurality of web-based markup languages including HTML, XHTML, XML, and SGML.

18. The machine readable medium of claim 10, wherein the instructions to store the content-searchable query document as an object within the document database for later retrieval further comprise instructions to assign to the content-searchable query document, access control attributes indicating which of a plurality of users may access the content-searchable query document within the database, wherein the access control attributes are compatible with one or more security policies of the database, which are applied to the one or more archived electronic documents.

19. An apparatus comprising:

means for identifying a first document database query to retrieve database objects from a database, the database storing one or more archived electronic documents;

means for forming a content-searchable query document from the first document database query;

means for receiving comment data describing the first document database query;

means for incorporating the comment data into the content-searchable query document, at least a portion of the comment data being used as searchable text for the later retrieval; and means for storing the content-searchable query document as an object within the database for later retrieval, wherein the object corresponding to the content-searchable query document is suitable to be managed by the database, as a part of the one or more archived electronic documents in accordance with a management scheme of the database.

20. The apparatus of claim 19 further comprising:

means for retrieving the content-searchable query document from the database in response to a second document database query compatible with the database;

means for incorporating additional information into the content-searchable query document; and means for optionally storing the content-searchable query document having the additional information in the database in accordance with the management scheme of the database.

21. The apparatus of claim 20, further comprising:

means for executing the content-searchable query document to retrieve additional document database objects, wherein the additional document database objects are retrieved based in part on at least a portion of the additional information incorporated within the content-searchable query document.

22. The apparatus of claim 20, wherein at least one of the database query, the second database query, and the content-searchable query document are HTML-formed queries.

23. The apparatus of claim 19, wherein means for identifying a database query includes means for receiving as input a newly formed document database query.

24. The apparatus of claim 19, wherein means for identifying a database query includes means for retrieving a pre-formed query from another content-searchable document stored in the database.

25. The apparatus of claim 19 wherein means for forming the content-searchable query document comprises means for generating a graphical representation of the database query and the comment data describing the database query.

26. The apparatus of claim 25, wherein the graphical representation comprises at least one of a plurality of web-based markup languages including HTML, XHTML, XML, and SGML.

27. The apparatus of claim 19, wherein means for storing the content-searchable query document as an object within the database for later retrieval includes:

means for assigning to the content-searchable query document, access control attributes indicating which of a plurality of users may access the content-searchable query document within the database, wherein the access control attributes are compatible with one or more security policies of the database, which are applied to the one or more archived electronic documents.

* * * * *